United States Patent Office 2,870,130
Patented Jan. 20, 1959

2,870,130

ETHYLENE POLYMERS

James M. Davison, Charleston, and John F. Erdmann, St. Albans, W. Va., assignors to Union Carbide Corporation, a corporation of New York No Drawing. Application January 4, 1956
Serial No. 557,233

4 Claims. (Cl. 260—94.9)

This invention relates to improved ethylene polymers and to a process for producing such polymers.

The preparation of solid polymers of ethylene by polymerizing ethylene at elevated temperatures and pressures was revealed in U. S. Patent No. 2,153,533. The process of said patent yields a solid polyethylene resin which is a mixture of crystalline and amorphous products ordinarily suitable for most purposes. The crystalline content of solid polyethylene can be measured by X-ray diffraction. It is also determinable from the density of the polymer. Theoretically completely crystalline polyethylene has a density of 1 and as the crystalline content of the resin decreases the density also decreases until at a density of about 0.89 the crystalline content is negligible and the polymer consists almost entirely of amorphous material. The polymers obtained by the process of U. S. 2,153,533 have densities up to about 0.923 and because of the high content of amorphous polymer these resins have lower hardness, lower stiffness, lower melting point and lower yield point than would be obtained with a more highly crystalline polymer. Also, since a portion of this polymer is present in the form of microscopic gels or agglomerates, such polyethylene mixtures when heated to the molten state and then extruded through a die form films having a fine surface roughness. This roughness on a thin sheet or film of the polymer gives the film a frosty appearance. In addition, as previously stated, the amorphous fraction present affects the softening point and the stiffness of the polyethylene, and products molded therefrom cannot be used where temperatures above about 85-90° C. are encountered without causing deformation of the molded product. Thus for example, cups and glasses molded from such polyethylene could not heretofore be washed in automatic dishwashers and polyethylene baby bottles could not be sterilized without incurring serious shape distortion.

For many purposes, a clear, transparent polyethylene film, substantially equivalent in clarity to film obtained with regenerated cellulose, is desired. Many processes have been proposed for increasing the clarity of polyethylene film but none have been completely satisfactory. For example, in U. S. Patent 2,480,615, it is suggested that polyethylene be heat-processed at just above its softening point in equipment such as extruders, or two-roll mills. The shearing action generated by such treatment is said to break down the microscopic gels or agglomerates whereby a resin of better flow characteristics is produced which can be readily extruded into film of lower frostiness. This film has a haze value of about 10 to 20 as compared to haze values of about 20 to about 50 when untreated resin is used. However, insofar as we have been able to determine such treatment does not increase the crystalline content of the polmer, and film produced from polymer hot-worked in this manner is not as smooth, or as clear and transparent, as film prepared from regenerated cellulose. Furthermore, products molded from such treated polymer lack the desired stiffness and are subject to distortion when exposed to temperatures at about the range of boiling water because of the low density of the polymer and its high amorphous resin content.

Another limitation of polyethylene polymer produced by the process of U. S. Patent 2,153,533 is that its rubbery characteristics at extrusion temperatures make it difficult to draw-down the extruded polyethylene to very thin films at rapid rates without frequent rupturing of the film. The usual practice in preparing film is to extrude the polyethylene as a relatively thick sheet of about 0.020 to about 0.035 inch thickness and then stretch the sheet while it is still above the softening point of the polyethylene to the final thickness desired, usually about 0.0003 to about 0.01 inch thick. If the heat-softened polyethylene is too rubbery during this stretching operation, then permanent flow and deformation do not occur and the stretched sheet will return to some extent to its original dimensions. If an attempt is made to make thinner sheets of such rubbery polyethylene polymer by increased stretching the film ruptures. While the hot-processing step improves this stretchability or drawn-down to some extent the degree of improvement is not as great as is desired and as stated above the crystalline content of the polyethylene has not been changed.

An object of this invention is to produce polymers of ethylene which when extruded and stretched form self-supporting films of improved clarity and transparency approaching the low haze values exhibited by films of regenerated cellulose.

Another object is to produce ethylene polymers having improved stretchability or drawn-down, said polymers being suitable for the preparation of self-supporting films, and said films having lower haze values than films previously produced.

A further object of this invention is to produce solid polymers of ethylene having higher density, greater hardness, higher yield strength, higher softening point, higher stiffness and decreased permeability to gases and liquids than heretofore obtained. Other objects will be evident as the description of the invention proceeds.

In accordance with this invention it has been found that ethylene polymers having the aforementioned desirable properties can be obtained by polymerizing ethylene in the presence of from about 0.05 to about 5 moles of an aliphatic ketone per 100 moles of ethylene and of a free radical catalyst at pressures of at least about 1350 atmospheres and at polymerization temperatures of from about 90° C. to 350° C. depending on the particular catalyst employed.

The ketone employed in the process of this invention may be a symmetrical aliphatic ketone containing from 3 to 11 carbon atoms such as acetone, diethyl ketone, diamyl ketone, diisobutyl ketone; or an unsymmetrical aliphatic ketone containing from 4 to 11 carbon atoms such as methylethyl ketone, methylisopropyl ketone, ethylbutyl ketone, or mixtures thereof. The preferred ketones, however, are the lower boiling ketones, such as acetone or diethyl ketone. Inasmuch as usually less than about 10% by weight of the ketone charged reacts with the ethylene the unreacted portion is removed after the polymer has been formed together with the unreacted ethylene. It is for this reason, to facilitate the removal of unreacted ketone, that the lower boiling ketones are preferred.

By the addition of ketone two main purposes are served, first, polymer is obtained which will extrude to clear transparent films, and second, higher density polymer is obtained which is especially suited for molding. For film purposes polymer having a density of from about 0.915 to about 0.94 and a melt index of from about 0.1 to about 15 is satisfactory. As the density increases the tendency of the clear film to electrostatically cling to itself is lessened. For this reason, even though polymer in the lower region of the specified density range can be used, it is desirable to obtain polymer having a high density and consequently a highly crystalline content. For molding purposes high density material is most desirable because of its higher crystallinity and consequently its greater stiffness, yield strength and hardness.

The ketone concentration charged depends to a great extent on the particular ketone selected, the catalyst concentration, the catalyst itself, the temperature and the pressure, and ranges from about 0.05 to about 5 moles of ketone per 100 moles of ethylene. Thus with an oxygen catalyst concentration of 45 p. p. m. at a reaction temperature of 175° C. and pressure of 30,000 p. s. i., the acetone concentration can be varied from 0.05 to about 3 moles per hundred moles of ethylene before the melt index is increased to above about 50 and the polymer strength is so reduced that molded articles prepared therefrom are too brittle. At acetone concentrations below about 1.5 moles per hundred moles of ethylene the polymer has a density of from about 0.915 to about 0.924 and a melt index below about 50. When the acetone concentration is increased above 1.5 moles per hundred moles of ethylene the density of the polymer is greater than 0.924 and the melt index does not exceed about 50 until about 3 moles of acetone per hundred moles of ethylene has been charged. At oxygen catalyst concentrations of 110 p. p. m., the acetone must be increased to at least about 1.8 moles per hundred moles of ethylene before resin with a density of 0.924 is obtained. The acetone concentration can be increased up to about 2.2 moles of acetone per hundred moles of ethylene before the melt index increases to above about 50.

With diisobutyl ketone at an oxygen catalyst concentration of 60 p. p. m. only about 0.25 mole per hundred moles of ethylene are required to raise the density to about 0.924 and up to about 1.2 moles per hundred moles of ethylene can be tolerated before the melt index increases to above about 50. Diethyl ketone under the same reaction conditions has a preferred range of from about 0.3 to about 0.6 mole of ketone per hundred moles of ethylene to yield polymer having a density above 0.924 and a melt index below 50.

By the term "free-radical catalyst" is meant a catalyst containing the —O—O— structural linkage which is capable of inducing polymerization of ethylene. As suitable catalysts one may employ oxygen; hydrogen peroxide; acyl or aroyl peroxides such as benzoyl peroxide, acetyl peroxide, tertiary butyl peroxide, di-tertiary butyl peroxide, lauroyl peroxide, di-benzoyl peroxide and methyl benzoyl peroxide. The concentration of the peroxide catalyst may be varied from about 0.001 to about 10 mole percent based on the total weight of reactants. With molecular oxygen the concentration of catalyst added may vary from about 20 to about 200 parts per million, with the lower concentrations preferred at higher reactor temperatures.

The polymerization can be carried out continuously in a tubular reactor, semi-continuously, or batchwise. In any event vigorous agitation and good cooling are required to provide for the rapid removal of the heat of polymerization.

Since the molecular weight of the polymer decreases, as evidenced by an increase in melt index, as the pressure is lowered, or as the concentration of ketone or catalyst is increased, it is necessary to adjust the reaction conditions so that the melt index of the resin is from about 0.1 to about 50 and the density is from about 0.915 to about 0.940. In order to obtain polyethylene of satisfactory strength suitable for extrusion to film a melt index below 15 and preferably below 10 is preferred. Resin having a melt index above 15 has such a low hot melt strength that frequent breaks occur in the extrusion process. For molding or extruding to form articles other than film the melt index can be above 15 but should be below about 50 since at melt indexes above about 50 the strength of the polymer is so greatly reduced that the molded articles are too brittle for most purposes. The reaction pressure should be at least about 1350 atmospheres and preferably from about 1700 to about 2400 atmospheres in order to obtain a practical conversion and a polymer having the desired melt index. The upper limit, however, is determined by the mechanical strength of the reactor and pumps available. The highest practical pressure is preferred because the highest molecular weights (lower melt index) are achieved, and higher conversions of ethylene to polymer are obtainable, as the pressure is increased.

The carbonyl content of the polyethylene resin, which serves as an indication of the amount of ketone which reacted and is bound in the resin molecule is readily determined by infra-red analysis. The absorbence at 5.7 to 5.9 microns is used in obtaining the carbonyl content. Polyethylene resins prepared in the absence of ketone as described in U. S. 2,153,533 usually have a carbonyl content below about 0.075 carbonyl groups per 1,000 carbon atoms. The carbonyl content of the ketone modified polyethylene resins of this invention, however, range from about 0.2 to about 0.8 carbonyl groups per 1000 carbon atoms for resin having a melt index range of from about 0.1 to about 50.

Higher polymerizing temperatures tend to lower the molecular weight of the polyethylene. While the process will form polymer from the minimum activation temperature for the catalyst, which for oxygen is about 160° C. and for the peroxide catalysts such as benzoyl peroxide and lauroyl peroxide is about 90° C., up to about 350° C., the greatest improvement in the polymer by the addition of ketone is observed at temperatures below about 250° C. with oxygen as catalyst and the preferred range with oxygen is from about 160° to about 225° C. With the peroxide catalysts a temperature below about 200° C. is preferred.

In the examples hereinafter shown the polymerization was carried out in a jacketed tubular steel reactor about 460 feet long having an inside diameter of one-half inch. The reaction mixture comprising ethylene, ketone and catalyst was compressed to 30,000 p. s. i. and fed continuously to the reactor wherein it was maintained at the same pressure while polymerization occurred. The polymer as formed was continuously discharged from the reactor into a hot pot where unreacted ethylene and ketone were flashed off, extruded into a water bath to cool and isolated by filtration. After isolation the resin was hot-processed and extruded to film-form, as hereinafter to be disclosed. The hot-processing is included to further enhance the advantages obtained by the addition of ketone. While the ketone-modified polymers of this invention are superior to the conventional polymers obtained by the process of U. S. 2,153,533 in manufacturing clear film, this superiority is further brought out by the short hot-processing treatment. This step, therefore, is optional for polymer to be used in preparing film and not necessary for polymer to be used in molding applications. The ketone modified polyethylene so obtained had a haze value, as measured according to A. S. T. M. D-1003-52, of less than about 15 percent. This compares to a haze value of about 25 percent usually obtained for polyethylene films made from polymer prepared as described in U. S. 2,153,533 and a haze value of less than about 5 percent for regenerated cellulose films.

The haze value of the film is measured according to the procedure described in A. S. T. M. D-1003-52 and is reported as that percent of the transmitted light which in passing through a specimen deviates from the incident beam by forward scattering. For the purpose of this method only light flux deviating more than 2.5° on the average is considered to be haze.

The melt index of the resins was determined by the method of A. S. T. M. D-1238-52T, and the density was determined as described by E. Hunter and W. G. Oaks, Trans. Faraday Soc., 41, 49 (1945). Stiffness was determined on a specimen 1½ inches long by ½ inch wide by 0.040 to 0.080 inch thick cut from a compression molded plaque which had been annealed at 23° C. for 24 hours according to the method of A. S. T. M. D-747-48T.

Carbonyl content was determined from the infra-red spectra. A sample of the resin was compression molded into a plaque 0.036±0.002 inch thick. This plaque was scanned in a Double-beam Model 13 Perkins-Elmer infra-red spectrophotometer over the 2 to 15 micron range. The absorbence of the band between 5.7 and 5.9 microns was used in the following equation to determine the carbonyl content:

$$\text{Carbonyl groups per 1000 C atoms} = \frac{\text{Absorbence} \times 26}{\text{Thickness in mils}}$$

The following examples illustrate the practice of this invention. Parts are by weight unless otherwise specified.

Example 1

Ethylene, containing about 20 parts per million by volume of oxygen and 1.0 mole of acetone, per hundred moles of ethylene, was compressed to 30,000 p. s. i. This mixture, which has a temperature of less than about 70° C., was forced through a jacketed tubular reactor about 460 feet long having an inside diameter of one-half inch at a rate of 1800 pounds per hour and at a reactor temperature of 175° C. and a reactor pressure of about 30,000 p. s. i. After passing through the reactor, the liquid polymer and unreacted ethylene and ketone were discharged intermittently through a suitable control valve to a heated separating vessel where the polymer was separated from the unreacted ethylene and ketone, which were recovered for recycling. The molten polymer was extruded into a water bath to cool and to aid in the removal of unreacted ketone and isolated therefrom. The resin had a melt index of 2.6 and a density of 0.925. It was transferred to a Banbury-type mixer and mixed for about 4 to 5 minutes until the temperature of the resin mass reached about 110° C. The heated resin mass was then discharged to a two-roll mill where it was rolled to a sheet about 3/16 inch thick, cooled, granulated and fed to an extruder. The polymer was extruded at a rate of 75 pounds per hour in a 2½ inch extruder equipped with a flat die having an opening 26 inches wide by 0.020 inch thick. The heat input was adjusted to produce a temperature of 210° C. in the resin as it left the die lips. The heat-softened resin was pulled downward by variable speed takeup rolls into a water bath held at about 60° C. The 0.020 inch thick extruded heat-softened resin was stretched to a film having a minimum thickness of about 0.0007 inch in a span of 2½ inches between the die lips and the surface of the water bath at a maximum velocity of about 170 feet per minute. The tough film was exceptionally clear and had a haze value of only 6 percent.

For purposes of comparison, ethylene was polymerized under similar conditions to yield a polymer having a melt index of 2.1 and a density of 0.920 without the addition of the ketone. This polymer was extruded into a film 0.0008 inch thick. The film had a haze value of 22 percent and was relatively frosty and dull. Furthermore, the maximum linear extrusion velocity which could be achieved before breaking was only 130 feet per minute.

Example 2

Ethylene, containing about 140 parts per million by volume of oxygen and 0.16 mole of diethyl ketone, per hundred moles of ethylene, was compressed to 30,000 p. s. i. This was reacted under the same conditions as described in Example 1 at a feed rate of 2,000 pounds per hour. The resin obtained had a melt index of 4.76 and a density of 0.918. Carbonyl content was 0.263 carbonyl group per 1,000 carbon atoms as determined by infra-red spectrometry. After hot-processing and extrusion, a film was produced having a final minimum thickness of about 0.0004 inch at a maximum linear velocity of about 200 feet per minute. The tough film was exceptionally clear and had a haze value of only 3.6 percent. This haze value was approximately equivalent to that of regenerated cellulose film, one sample of which had a haze value of 1.3 percent.

Example 3

Ethylene, containing about 75 parts per million by volume of oxygen and 0.34 mole of diethyl ketone, per hundred moles of ethylene, was compressed to 30,000 p. s. i. This was reacted under conditions similar to those described in Example 1 at a feed rate of 2000 pounds per hour. The resin obtained had a melt index of 6.6 and a density of 0.923. Carbonyl content was 0.52 carbonyl group per 1,000 carbon atoms as determined by infra-red spectrometry. After hot-processing and extrusion, a film was produced having a final minimum thickness of about 0.0007 inch at a maximum linear velocity of about 195 feet per minute. This film had an exceptionally superior clarity and had a haze value of only 1.8 percent.

Example 4

Ethylene, containing about 34 parts per million by volume of oxygen and 1.5 moles of acetone, per hundred moles of ethylene, was compressed to 30,000 p. s. i. This was reacted under conditions similar to those described in Example 1. The polyethylene obtained had a melt index of 11.5, a density of 0.927 and a stiffness at 23° C. of 51,000 p. s. i. Carbonyl content was 0.585 carbonyl group per 1,000 carbon atoms as determined by infra-red spectrometry. Drinking cups molded from this polymer could be washed in an automatic dishwasher (temperature 85°–90° C.) without distortion. Whereas, cups molded from conventional low density ethylene polymer prepared in the absence of ketone had a stiffness of only about 23,000 p. s. i. at 23° C. and distorted badly when washed under similar conditions.

Example 5

Ethylene, containing about 52 parts per million by volume of lauroyl peroxide and 1.6 moles of acetone, per hundred moles of ethylene, was compressed to 30,000 p. s. i. This was reacted under conditions similar to those described in Example 1. The resin obtained had a melt index of 1.2 and a density of 0.936.

Example 6

Ethylene, containing about 63 parts per million by volume of oxygen and 0.601 mole of diethyl ketone, per hundred moles of ethylene, was compressed to 30,000 p. s. i. This was reacted under conditions similar to those described in Example 1. The polyethylene obtained had a melt index of 39.3 and a density of 0.9323. Carbonyl content was 0.755 carbonyl group per 1,000 carbon atoms as determined by infra-red spectrometry.

Example 7

Ethylene, containing about 62 parts per million by volume of oxygen and 0.35 mole of diethyl ketone, per hundred moles of ethylene, was compressed to 30,000 p. s. i. This was reacted under conditions similar to those described in Example 1. The polyethylene had a melt index of 14, a density of 0.926 and a stiffness at 23° C. of 37,000 p. s. i. Carbonyl content was 0.52 carbonyl group per 1,000 carbon atoms as determined by infra-red spectrometry.

What is claimed is:

1. A process for producing solid polyethylene resins having a density between about 0.915 and about 0.94 gram per cc. and a carbonyl content between about 0.2 and about 0.8 carbonyl group per 1000 carbon atoms, which comprises heating a mixture of ethylene and an aliphatic ketone, said mixture containing from about 0.05 to about 5 moles of aliphatic ketone per 100 moles of ethylene, at a temperature between about 90° C. and about 350° C. under an ethylene pressure above 1500 atmospheres in the presence of a free-radical catalyst, said aliphatic ketone having from 3 to 11 carbon atoms.

2. A process for producing solid polyethylene resins having a density between about 0.915 and about 0.94 gram per cc. and a carbonyl content between about 0.2 and about 0.8 carbonyl group per 1000 carbon atoms, which comprises heating a mixture of ethylene and an aliphatic ketone, said mixture containing from about 0.05 to about 5 moles of aliphatic ketone per 100 moles of ethylene at a temperature of from about 160° C. to about 250° C. under an ethylene pressure above 1500 atmospheres in the presence of oxygen as catalyst, said aliphatic ketone having from 3 to 11 carbon atoms.

3. A process for producing solid polyethylene resins having a density between about 0.915 and about 0.94 gram per cc. and a carbonyl content between about 0.2 and about 0.8 carbonyl group per 1000 carbon atoms, which comprises heating a mixture of ethylene and an aliphatic ketone, said mixture containing from about 0.05 to about 5 moles of aliphatic ketone per 100 moles of ethylene, at a temperature of from about 90° C. to about 200° C. under an ethylene pressure of from above 1500 atmospheres in the presence of a peroxy catalyst, said aliphatic ketone having from 3 to 11 carbon atoms.

4. An aliphatic ketone-modified solid polyethylene resin obtained by the process of claim 1, said resin having a melt index of from about 0.1 to about 50 decigrams per minute, a density of from about 0.915 to about 0.94 gram per cc. at 23° C. and a carbonyl content of from about 0.2 to about 0.8 carbonyl group per 1000 carbon atoms as determined by infra-red spectrometry.

References Cited in the file of this patent

UNITED STATES PATENTS

| | | |
|---|---|---|
| 2,402,137 | Hanford et al. | June 18, 1946 |
| 2,475,648 | Stoner et al. | July 12, 1949 |
| 2,480,615 | Strain et al. | Aug. 30, 1949 |

FOREIGN PATENTS

| | | |
|---|---|---|
| 469,547 | Canada | Nov. 21, 1950 |

OTHER REFERENCES

"Elastomers and Plastomers," Houwink, Elsevier, 1950, New York, N. Y., volume 1, pages 382–390. (Copy in Scientific Library.)